(12) United States Patent
Koch

(10) Patent No.: US 6,690,132 B2
(45) Date of Patent: Feb. 10, 2004

(54) ASSEMBLY FOR ADJUSTING MOBILE ELEMENTS OF FURNITURE

(75) Inventor: Dietmar Koch, Gummersbach (DE)

(73) Assignee: OKIN Gesellschaft fur Antriebstechnik mbH & Co. KG, Gummersbach (DE)

( * ) Notice: Subject to any disclaimer, the term of this patent is extended or adjusted under 35 U.S.C. 154(b) by 0 days.

(21) Appl. No.: 10/221,657

(22) PCT Filed: Mar. 12, 2001

(86) PCT No.: PCT/DE01/00925

§ 371 (c)(1),
(2), (4) Date: Sep. 13, 2002

(87) PCT Pub. No.: WO01/69745

PCT Pub. Date: Sep. 20, 2001

(65) Prior Publication Data

US 2003/0038605 A1 Feb. 27, 2003

(30) Foreign Application Priority Data

Mar. 14, 2000 (DE) .......................................... 100 12 050

(51) Int. Cl.⁷ ................................................. G05B 5/00
(52) U.S. Cl. ...................... 318/445; 318/727; 318/729; 318/808
(58) Field of Search ................................. 318/727, 729, 318/808, 811, 812, 445; 363/127

(56) References Cited

U.S. PATENT DOCUMENTS

| 5,528,449 A | 6/1996 | Koch ......................... 361/160 |
| 6,195,276 B1 * | 2/2001 | Sebille ........................ 363/127 |
| 6,445,156 B2 * | 9/2002 | Marinus et al. ............. 318/727 |

* cited by examiner

*Primary Examiner*—Karen Masih
(74) *Attorney, Agent, or Firm*—Grossman, Tucker, Perreault & Pfleger, PLLC

(57) ABSTRACT

The invention relates to an assembly for adjusting mobile elements of furniture, comprising a motor, a control circuit which is provided with push-button switches, a current supply circuit, a mains connection, a mains supply circuit, a mains isolating relay and an auxiliary current source. The aim of the invention is to construct said assembly in a more cost-effective manner whilst at the same time retaining a safety isolation from the mains. To achieve this, the first push-button switch forms a direct electric circuit with the motor and the control input of the isolating relay is connected in parallel to the motor, or is connected to the latter via a Graetz bridge.

12 Claims, 5 Drawing Sheets

ASSEMBLY FOR ADJUSTING MOBILE ELEMENTS OF FURNITURE

Figure 1:
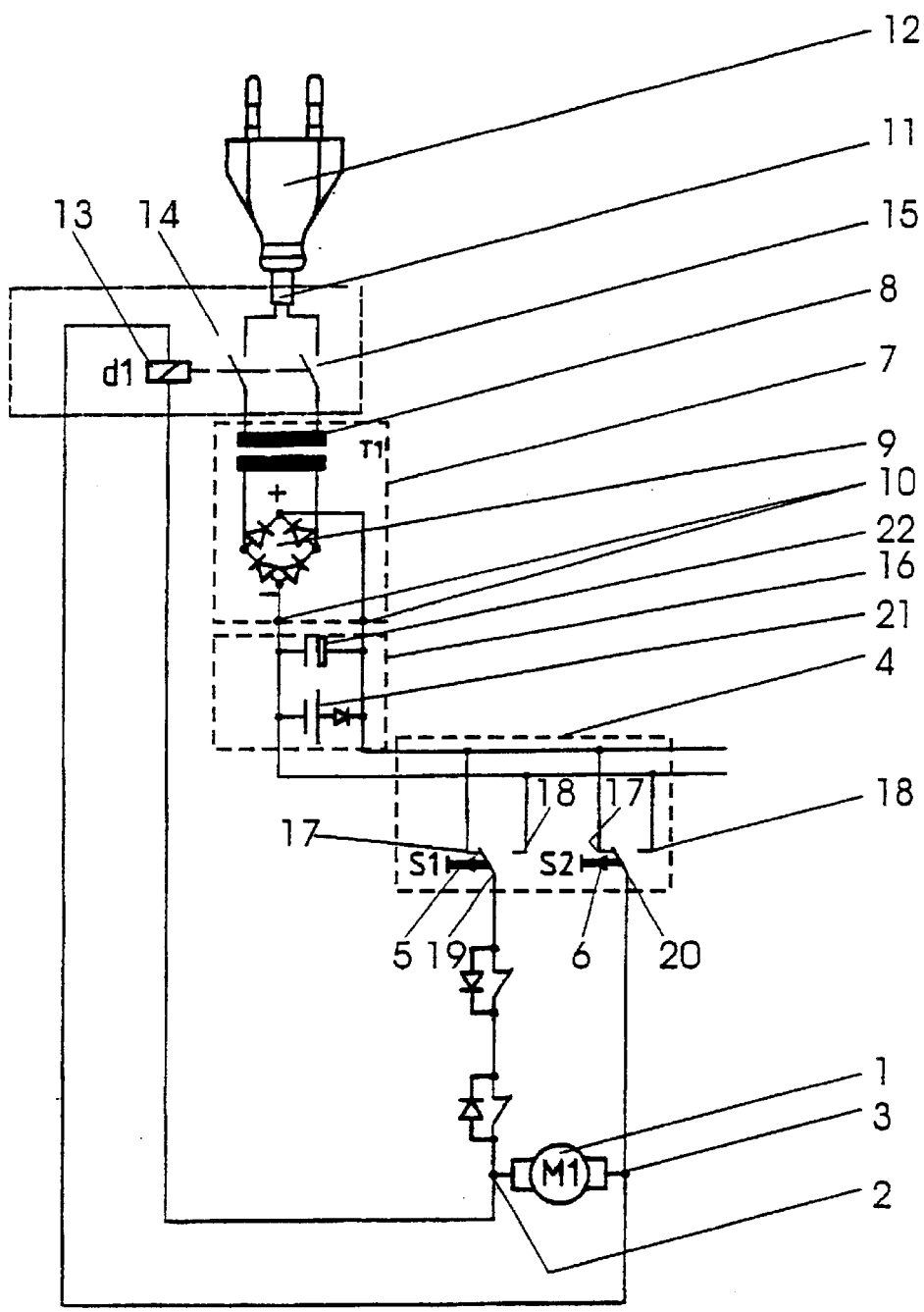

The invention relates to an assembly for adjusting mobile elements of furniture, with a motor displaying a first and a second connection, a control circuit for controlling the motor, which is provided with at least a first push-button switch for controlling the motor, a power supply circuit with an operating voltage output, with a mains connection located between a mains plug that can be connected to an alternating-current mains and the power supply circuit, with a relay displaying a relay switch and a control input controlling the relay switch, where the relay switch is located in the mains connection and is in OFF position when unexcited, and with an auxiliary power source that can be connected to the control input of the relay.

An assembly of the kind mentioned above is known from European Patent Specification 0 615 667 B1. The assembly described therein for safety isolation of control devices from the mains refers to an assembly for adjusting mobile elements of furniture that is provided with two motors. One motor displays a first and a second connection. Furthermore, a control circuit comprising a first and a second push-button switch is provided for each motor. The control circuit of a motor also includes a first and a second relay. The relay coil of the first relay is connected to operating potential via the first push-button switch and the relay coil of the second relay via the second push-button switch. The relay switches of both relays are designed as changeover switches, where one changeover contact is connected to the operating voltage output of the one polarity and the other changeover contact with the operating voltage output of the other polarity. The centre contact of the relay switch of the first relay is connected to the first connection of the motor and the centre contact of the relay switch of the second relay to the second connection of the motor. In unexcited state, the relay switches each establish a connection between their centre contact and the operating voltage output with the same polarity as on the respective other relay switch.

In this known assembly, the operating voltage source is designed as a direct-current source and each motor as a direct-current motor. As a result, the design of the control circuit provides control of the direction of the motors. If, for example, the first push-button switch is operated, the first relay picks up and switches over the relay switch. While the first and second connection of the motor had the same potential up to that time, the switching operation now connects the first connection to the other operating voltage potential. The motor thereupon performs motion in one direction until the first push-button switch is released. If the second push-button switch is subsequently operated, the second relay picks up, thereby reversing the polarity on the motor and causing the motor to move in the other direction.

In this known assembly, there is also a third relay with a relay switch located in the mains lead to the power supply circuit. An auxiliary power source is connected in parallel to the operating voltage output of the power supply circuit. This auxiliary power source is connected to the control input of the third relay via each of the push-button switches.

Since the relay switch of the third relay is in OFF position when unexcited, the power supply circuit is initially isolated from the mains. If one of the push-button switches is now operated, the voltage of the auxiliary power source is applied to the control input of the third relay via the push-button. This relay picks up as a result and switches its relay switch to the ON position. The power supply circuit is thereby connected to the mains voltage and supplies an operating voltage at its operating-voltage output. As a result, each of the relays forming part of the control circuit can pick up, provided the associated push-button switch is pressed. The motor thereupon performs its adjusting motion. The third relay remains operational during this time, since its control input is now supplied with operating voltage. If the push-button switch is released, for instance because the necessary adjusting motion has been completed, the relay associated with the respective push-button drops off, as does the third relay, and the circuit arrangement is once again isolated from the mains.

The disadvantage of this arrangement is that each push-button switch has to be provided with a relay, meaning that the circuit arrangement not only requires a considerable amount of space, but is also complex and expensive to manufacture.

Consequently, the object of the invention is to disclose an assembly for adjusting mobile elements of furniture that can be constructed more easily and cost-effectively while maintaining safety isolation from the mains, i.e. isolation from the mains during times when no control functions have to be executed and connection to the mains when control commands are received.

According to the invention, this object is solved in that the first push-button switch forms an electric circuit with the motor and the operating voltage output. Moreover, either the control input of the mains isolating relay is connected in parallel to the motor, or a rectifier bridge known as a Graetz bridge is connected between the motor and the control input of the mains isolating relay. A rectifier bridge of this kind is provided with four diodes, of which two first diodes have their cathodes interconnected in a positive node, while their anodes are each interconnected with the cathodes of the two second diodes in an alternating-current node. In this context, the first and second connections of the motor are each connected to an alternating-current node. The positive and negative nodes are each connected to the control input of the mains isolating relay.

The first alternative provides for the simplest realisation of the solution according to the invention, where both the motor and the mains isolating relay are connected directly by the first push-button. In this context, the relay switch of the mains isolating relay is in OFF position when in quiescent state. Consequently, the power supply circuit is not connected to the mains. If the first push-button is pressed in order to start the motor, the voltage from the auxiliary power source is applied via the first push-button switch to the mains isolating relay, which picks up and connects the power supply circuit to the mains. Operating voltage is then present at the operating-voltage output and the mains isolating relay is held in picked-up state by the operating voltage for as long as the first push-button switch is pressed. When it is released, the voltage at the control input of the mains isolating relay is interrupted and this mains isolating relay drops off. The power supply circuit is then no longer connected to the mains, since the relay switch of the mains isolating relay is once again in OFF position.

The second alternative of the solution according to the invention displays the same mode of operation. When the push-button switch is pressed, the voltage from the auxiliary power source is applied to the control input of the mains isolating relay via the rectifier bridge, causing the mains isolating relay to pick up and connect the power supply circuit to the mains for as long as the push-button switch is pressed. However, interconnection of the rectifier bridge avoids feedback from the control input of the mains isolating relay to the motor connections. This permits the use of several motors, for example, all of which operate with one mains isolating relay, as described in more detail below.

In one embodiment of the invention, provision is made for the operating-voltage output to be designed as a DC output and the motor as a DC motor.

Designing the invention with DC motors offers not only favourable torque distribution, but also the advantage of simple control of the sense of rotation of the motors.

Especially for simple control of the sense of rotation of the DC motors, a further embodiment of the invention provides for the inclusion of a second push-button switch and for both the first and the second push-button switch to be designed as changeover switches. One of their changeover contacts is connected to the operating-voltage output of the one polarity, while the other changeover contact is connected to the operating voltage of the other polarity. The centre contact of the first push-button switch is connected to the first connection of the motor, and the centre contact of the second push-button switch is connected to the second connection of the motor. When not operated, each push-button switch displays a connection between its centre contact and the operating-voltage output with the same polarity as the other push-button switch.

This arrangement makes it possible to cause the motor to rotate in one direction with the first push-button switch and in the other direction with the second push-button switch. In this context, either one push-button switch or the other must be operated in order to obtain rotation. Simultaneous operation would not, however, be dangerous. It would merely not cause any movement of the motor.

In another embodiment of the invention, there is provision for the motor assembly, comprising the motor and the first or the first and second push-button switch, to be present at least in duplicate. In this context, each motor assembly can be provided with a mains isolating relay, the control input of which is connected in parallel to the associated motor, while the relay switches of all mains isolating relays are connected in parallel to each other. Alternatively, each motor assembly can be provided with a rectifier bridge, the alternating-current node of which is connected to the connections of the respective motor and whose positive and negative nodes are each jointly connected to the control input of one and the same mains isolating relay.

This embodiment makes it possible to use several motors that can be controlled directly by one control circuit, meaning that an interconnected relay is avoided while preserving the possibility of safety isolation from the mains. When a motor is switched on, operating voltage is present between its first and second connections. If several motors were then connected to one and the same mains isolating relay, the connection of the mains isolating relay in parallel to the motors would cause the operating voltage to cross from the activated motor to the others. This is prevented either by the rectifier bridge connected between each motor and the one mains isolating relay, or by installing several, separate mains isolating relays.

In another embodiment of the invention, there is provision for the auxiliary power source to consist of an alternating-current source. In this context, it is conceivable for an auxiliary transformer to be provided, the secondary output of which is connected in parallel to the operating-voltage output of the power supply circuit. This provides an alternating voltage as the auxiliary power for switching on the mains isolating relay.

This kind of application of an auxiliary alternating voltage is conceivable both in an embodiment using AC voltage as the operating voltage and AC motors, and when using DC voltage as the operating voltage. In the latter case, either the AC voltage from the auxiliary power source could be rectified, or the auxiliary power source could display such a high internal resistance that DC components are not destroyed or switch off the auxiliary power source as soon as the mains isolating relay has picked up, for which purpose a separate relay switch can be provided, for example.

However, it must be noted that there is no complete safety isolation from the mains in this context, since the auxiliary power source remains connected to the mains as a power source in the circuit arrangement.

In a more favourable embodiment of the invention, the auxiliary power source consists of a direct-current source. In principle, it is possible for the direct-current source to again be designed with a mains connection, for instance using a transformer and a downstream rectifier circuit. Expediently, however, the direct-current source can also be designed as a direct-current source that is electrically isolated from the mains.

In one embodiment of the invention, this is realised in that the auxiliary power source consists of a capacitor. Capacitors with relatively low leakage currents are expediently used for this purpose in order to retain an existing charge for an acceptable period of time. As a general rule, assemblies according to the invention are operated at least once over a period of one week. This period will suffice to maintain the capacitor charge.

In the event that longer periods of non-use of the assembly according to the invention have to be bridged, operating reliability can be increased by providing a manual operating device on the relay contact of the mains isolating relay.

Another possibility for reliably maintaining the charge of the capacitor as the auxiliary power source is to provide a trigger circuit having a pulse output that is additionally connected to the mains isolating relay. This trigger circuit intermittently switches the mains isolating relay, as a result of which the power supply circuit briefly supplies operating voltage at its operating-voltage output, thus charging the capacitor back up to operating voltage potential. The interval between pulses is governed by the leakage current of the capacitor, making it possible also to use relatively inexpensive capacitors, which usually also have relatively high leakage currents. Even if a pulse interval of several minutes were to be selected, the influence of the alternating-current mains, which is essentially to be avoided by safety isolation from the mains, would be completely negligible.

Another embodiment of the auxiliary power source as a direct-current source consists in the auxiliary power source comprising a battery. Since batteries can have service lives of more than a year, especially if they are used only very rarely, as in the case in question, a battery ensures operational readiness at all times. Absent operational readiness in the event of a drained battery can be prevented by means of a regular maintenance cycle of the assembly according to the invention.

In a particularly favourable embodiment of the invention, provision is made for the mains isolating relay to display a second relay switch or, in the event of there being several mains isolating relays, for each mains isolating relay to display a second relay switch and for each of these relay switches to be located in a separate line of the mains connection.

This embodiment implements bipolar disconnection of the mains lead. This means that the downstream arrangement can be shielded not only from alternating electromagnetic fields, but also alternating electrical fields.

The invention is explained in more detail below on the basis of a practical example.

Figure 2:
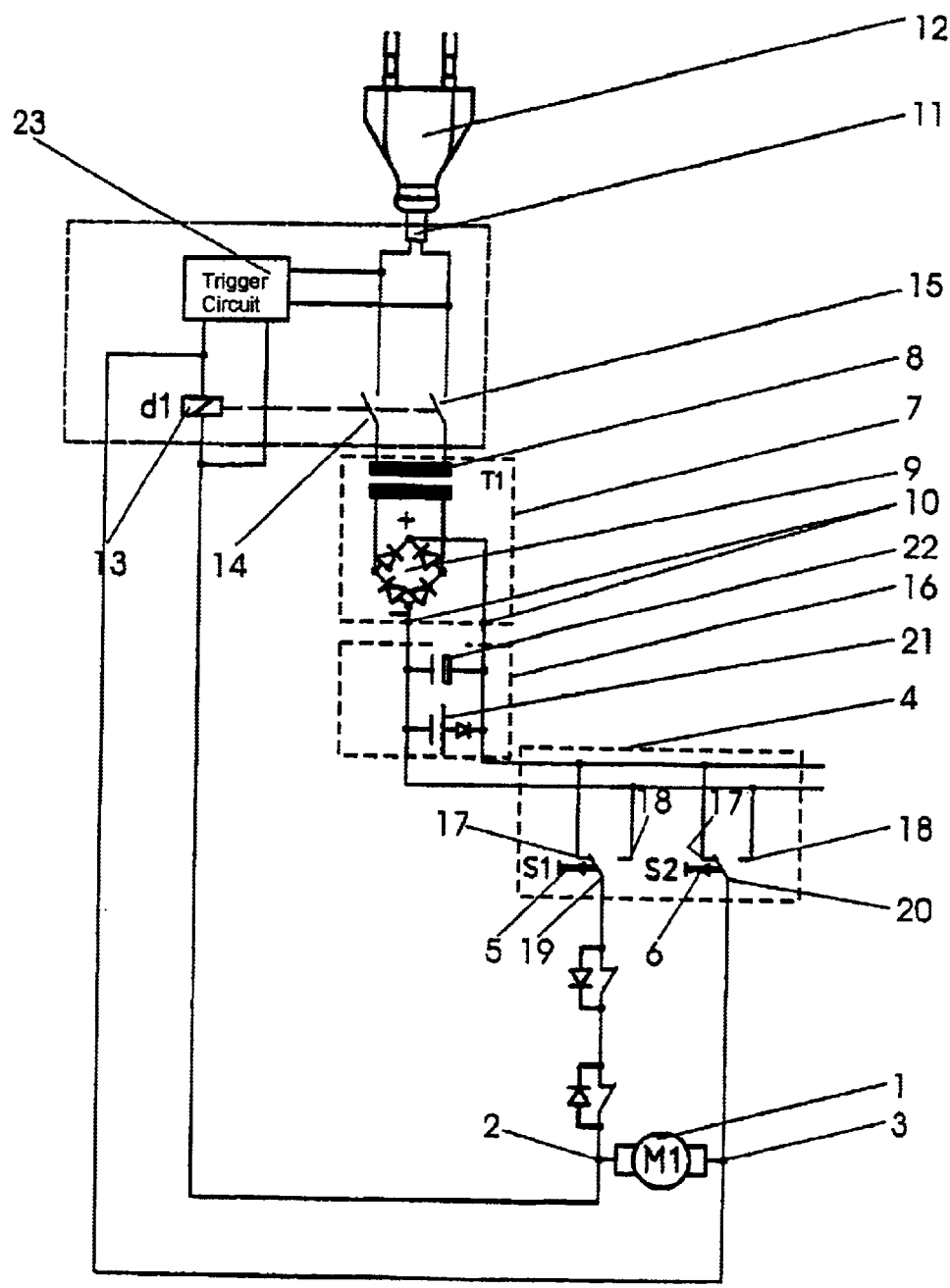
Figure 3:
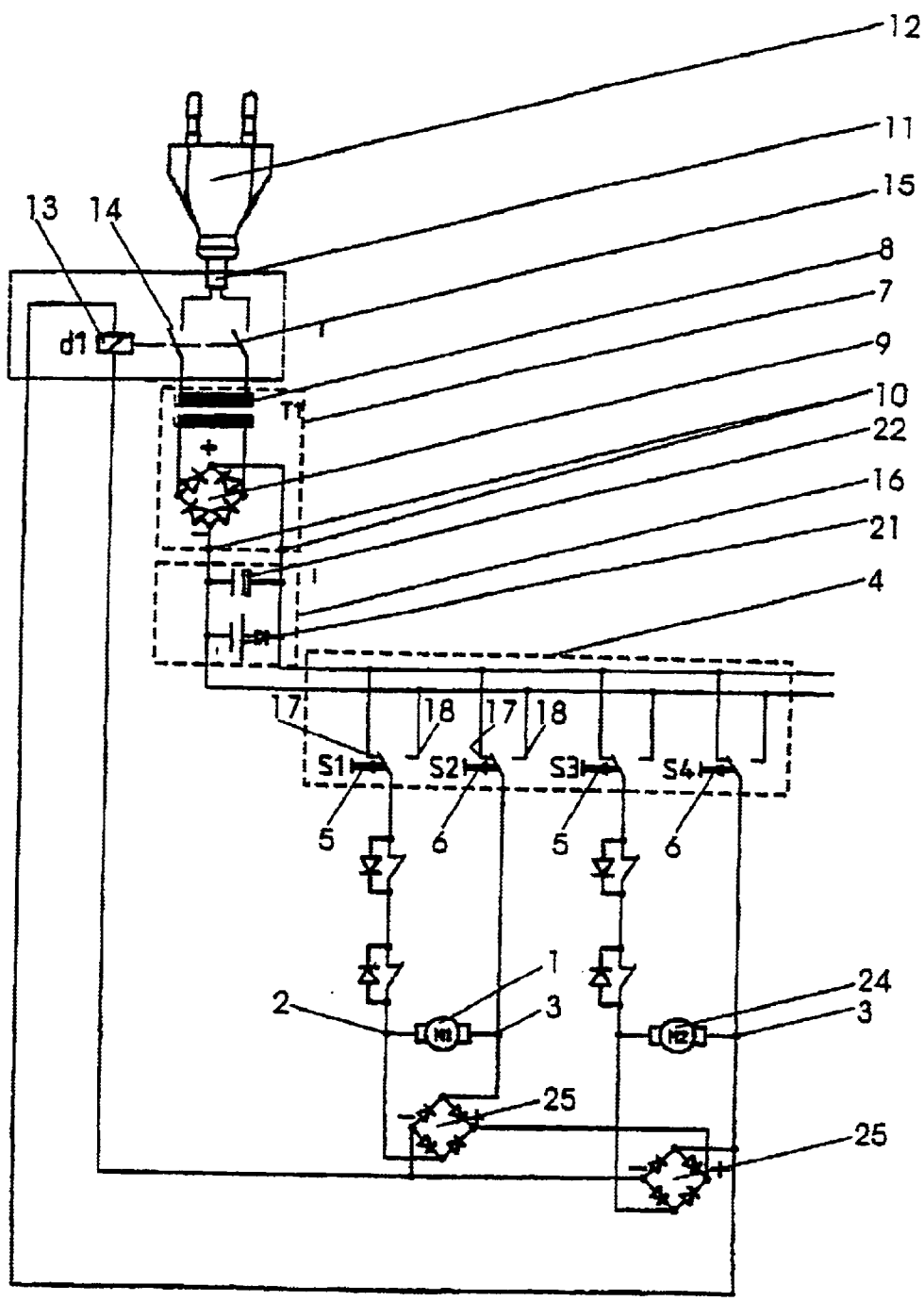
Figure 4:
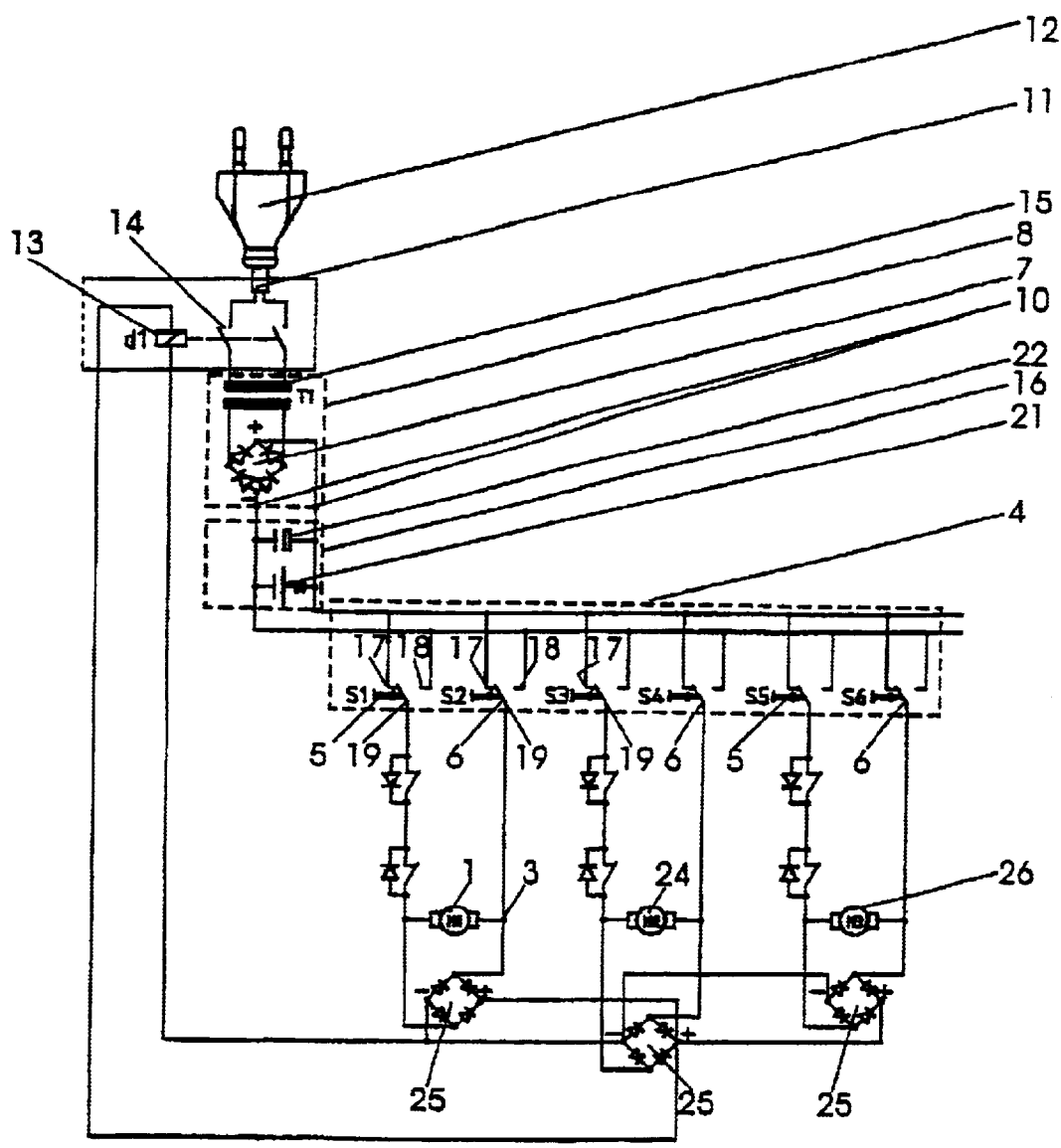
Figure 5:
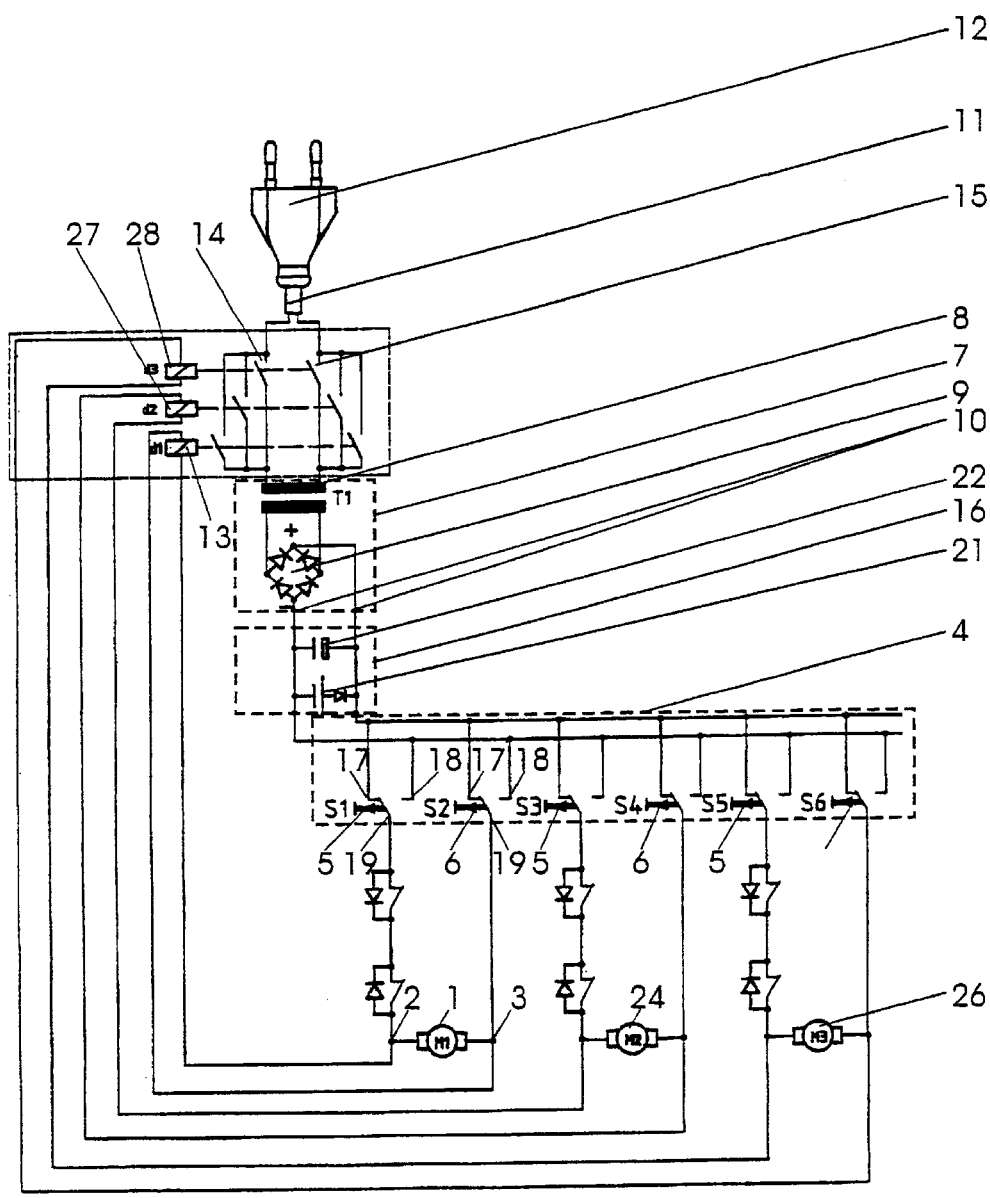

The associated figures show the following:

FIG. 1 An assembly according to the invention with one motor,

FIG. 2 An assembly according to the invention with an additional, pulse-switched mains isolating relay, FIG. 3 An assembly with two motors, each of which is decoupled via a rectifier bridge, FIG. 4 An assembly according to the invention with three motors, each of which is decoupled via a rectifier bridge, FIG. 5 An assembly according to the invention with three motors, each of which is assigned a mains isolating relay.

The assembly shown in FIG. 1 is equipped with a first motor 1. This first motor 1 has a first connection 2 and a second connection 3. Also provided is a control circuit 4, which is equipped with a first push-button switch 5 and a second push-button switch 6. A power supply circuit 7 comprises a transformer 8 and a rectifier circuit 9. The direct-current output of rectifier circuit 9 simultaneously represents operating-voltage output 10 of power supply circuit 7. The assembly is further provided with a mains connection 11, which is located between a mains plug 12 that can be connected to an alternating-current mains (not shown in detail) and power supply circuit 7.

A mains isolating relay 13 is provided for disconnecting mains connection 11 between mains plug 12 and power supply circuit 7. This mains isolating relay 13 displays a first relay switch 14 and a second relay switch 15. These relay switches 14 and 15 are each located in a line of mains connection 11. When mains isolating relay 13 is unexcited, i.e. in the state where the relay coil of the mains isolating relay is not receiving power, they are in OFF position, i.e. they are open and disconnect the mains lead. Also provided is an auxiliary power source 16, which is connected in parallel to operating-voltage output 10.

First push-button switch 5 and second push-button switch 6 form an electric circuit together with motor 1 and operating-voltage output 10. First push-button switch 5 and second push-button switch 6 are each designed as changeover switches. One of their changeover contacts 17 is connected to the operating-voltage output with positive (+) polarity, while the other changeover contact 18 is connected to the operating-voltage output with negative (−) polarity. Centre contact 19 of first push-button switch 5 is connected to first connection 2 of motor 1. Centre contact 20 of second push-button switch 6 is connected to second connection 3 of motor 1. In this context, each push-button switch 5 and 6 is configured in such a way that, when not operated, it makes a connection between its centre contact 19 or 20 and the operating-voltage output 10 with positive (+) polarity.

As illustrated in FIG. 1, the control input of mains isolating relay 13 is connected in parallel to motor 1.

If first push-button switch 5 is now operated, for example, the parallel connection of motor 1 and mains isolating relay 13 results in the voltage from auxiliary power source 16 being applied to the coil of mains isolating relay 13. Mains isolating relay 13 thereupon operates first relay switch 14 and second relay switch 15, which thus move into ON position and connect the mains lead to power supply circuit 7, i.e. particularly with the primary side of transformer 8. Operating voltage is thereupon supplied at operating-voltage output 10 of power supply circuit 7, as a result of which operating potential is applied to motor 1 which can consequently move. This happens for as long as first push-button switch 5 is pressed, in which context the movement of motor 1 can also be limited by a limit switch (not shown). As soon as first push-button switch 5 is released, it returns to its original starting position, as a result of which positive potential is again applied to first connection 2 of motor 1, just as to second connection 3 of motor 1. Motor 1 comes to a halt due to the absence of a potential difference.

The same procedure takes place when second push-button switch 6 is pressed, the only difference being that first motor 1 experiences a reversal of polarity between its first connection 2 and its second connection 3, this bringing about a reversal of the sense of rotation of motor 1.

As in FIG. 1, auxiliary power source 16 in FIG. 2 again consists of battery 21 with capacitor 22 connected in parallel. This parallel connection means that an auxiliary voltage with a low internal resistance is constantly supplied, thereby achieving a rapid response of the mains isolating relay. Although battery 21 keeps capacitor 22 in a constant charge state, which is additionally constantly refreshed by operating-voltage output 10, it may happen in the worst case that battery 21 is drained and the entire circuit arrangement has not been operated for such a long time that the leakage current of capacitor 22 has discharged the latter. To also prevent this occurrence, a trigger circuit 23 is provided, the pulse output of which is additionally connected to the control input of mains isolating relay 13. This trigger circuit 23 intermittently switches on mains isolating relay 13, meaning that operating-voltage output 10 supplies operating voltage for the duration of the pulse, this recharging capacitor 22. Although the assembly is not isolated from the mains during the occurrence of the pulse from trigger circuit 23, this happens so rarely and for such a short period of time that the influence of the alternating-current mains can be completely neglected.

In the embodiment illustrated in FIG. 3, a second motor 2 is arranged alongside first motor 1. Like first motor 1, this second motor 2 is also provided with a control circuit 4, which in turn comprises a first push-button switch 5 and a second push-button switch 6.

In this circuit arrangement, mains isolating relay 13 is no longer connected directly in parallel to motor 1 or second motor 24. Instead, a rectifier circuit 25 known as a Graetz bridge is connected between them. This is done in such a way that first connection 2 and second connection 3 of motor 1 are connected to the alternating-current node. The negative and the positive node of rectifier circuit 25 are connected to the control input of mains isolating relay 13. A rectifier circuit 25 is also connected to second motor 24 and mains isolating relay 13 in the same way. The effect of rectifier circuits 25 is that the application of operating voltage to first motor 1 has no influence on second motor 24 and vice versa. In other words, the motors are decoupled from each other by rectifier circuits 25, although the application of operating voltage between their first connection 2 and their second connection 3 always results in mains isolating relay 13 picking up.

As illustrated in FIG. 4, the circuit arrangement according to FIG. 3 can also be expanded to include a third motor 26 and further motors not shown in the drawing.

Another possibility for using several motors 1, 24 and 26 is illustrated in FIG. 5. In this circuit arrangement, the rectifier circuit 25 for each motor is eliminated. Instead, in addition to mains isolating relay 13 provided for motor 1, there is a mains isolating relay 27 for second motor 24 and a mains isolating relay 28 for third motor 26. Thus, each motor has its "own" mains isolating relay. The mode of operation is in each case the same as that illustrated in FIG. 1. To this end, the respective relay switches 14 and 15 of mains isolating relays 13, 27 and 28 are connected in parallel to each other. As a result, every application of operating voltage to one of motors 1, 24 and 26 causes one of mains isolating relays 13, 27 and 28 to pick up, while the parallel connection of relay switches 14 and 15 means that the alternating mains voltage is always connected through to power supply circuit 7.

LIST OF REFERENCE NUMBERS

1. First motor
2. First connection
3. Second connection
4. Control circuit
5. First push-button switch
6. Second push-button switch
7. Power supply circuit
8. Transformer
9. Rectifier circuit
10. Operating-voltage output
11. Mains connection
12. Mains plug
13. Mains isolating relay
14. First relay switch
15. Second relay switch
16. Auxiliary power source
17. Changeover contact
18. Changeover contact
19. Centre contact of the first push-button switch
20. Centre contact of the second push-button switch
21. Battery
22. Capacitor
23. Trigger circuit
24. Second motor
25. Rectifier bridge
26. Third motor
27. Mains isolating relay
28. Mains isolating relay

What is claimed is:

1. Assembly for adjusting mobile elements of furniture, with a motor displaying a first and a second connection, a control circuit for controlling the motor, which is provided with at least a first push-button switch for controlling the motor, a power supply circuit with an operating voltage output, a mains connection located between a mains plug that can be connected to an alternating-current mains and the power supply circuit, a mains isolating relay displaying a relay switch and a control input controlling the relay switch, where the relay switch is located in the mains connection and is in OFF position when unexcited, and an auxiliary power source that is connected in parallel to the operating-voltage output, characterised in that the first push-button switch (5) forms an electric circuit with the motor (1) and the operating voltage output (10) and either the control input of the mains isolating relay (13) is connected in parallel to the motor (1)

or a rectifier bridge (25), known as a Graetz bridge, which has four diodes, of which two first diodes have their cathodes interconnected in a positive node, while their anodes are each interconnected with the cathodes of the two second diodes in an alternating-current node and the cathodes of the two second diodes are interconnected in a positive node, and where one alternating-current node each is connected to the first and second connection of the motor and the positive and negative node are each connected to the control input of the mains isolating relay (13).

2. Assembly according to claim 1, characterised in that the operating-voltage output (10) is designed as a DC output and the motor (1) as a DC motor.

3. Assembly according to claim 2, characterised in that a second push-button switch (6) is provided and in that the first (5) and the second push-button switch (6) are designed as changeover switches, one of whose changeover contacts (17) is connected to the operating-voltage output (10) of the one polarity, while the other changeover contact (18) is connected to the operating voltage output (10) of the other polarity and the centre contact (19) of the first push-button switch (5) is connected to the first connection (2) of the motor (1) and the centre contact (20) of the second push-button switch (6) is connected to the second connection (3) of the motor (1) and, when not operated, each push-button switch (5; 6) switch displays a connection between its centre contact (19; 20) and the operating-voltage output (10) with the same polarity as the other push-button switch (6; 5).

4. Assembly according to claim 1, characterised in that the motor assembly, comprising the motor (1) and the first (5) or the first (5) and second push-button switch (6), is present at least in duplicate, where either each motor assembly is provided with a mains isolating relay (13; 27; 28), the control input of which is connected in parallel to the associated motor (1; 24; 26), while the relay switches of all mains isolating relays (13; 27; 28) are connected in parallel to each other, or each motor assembly is provided with a rectifier bridge (25), the alternating-current node of which is connected to the connections of the respective motor and whose positive and negative nodes are each jointly connected to the control input of one and the same mains isolating relay (13).

5. Assembly according to claim 1, characterised in that the auxiliary power source (16) consists of an alternating-current source.

6. Assembly according to claim 5, characterised in that the auxiliary power source (16) consists of a mains transformer connected to the alternating-current mains.

7. Assembly according to claim 1, characterised in that the auxiliary power source (16) consists of a direct-current source.

8. Assembly according to claim 7, characterised in that the auxiliary power source (16) consists of a capacitor (22).

9. Assembly according to claim 8, characterised in that a manual operating device is provided on the relay switch (14; 15) of the mains isolating relay (13).

10. Assembly according to claim 8, characterised in that a trigger circuit (23) is provided having a pulse output that is additionally connected to the mains isolating relay (13).

11. Assembly according to claim 7, characterised in that the auxiliary power source (16) consists of a battery (21).

12. Assembly according to claim 1, characterised in that the mains isolating relay (13; 27; 28) displays a second relay switch (15), or the mains isolating relays each display a second relay switch (15) and in that each relay switch (14; 15) is located in a separate line of the mains connection (11).

* * * * *